(12) United States Patent
Colombi

(10) Patent No.: US 7,765,962 B2
(45) Date of Patent: Aug. 3, 2010

(54) RECIPROCATING AND ROTARY PISTON ENGINE

(75) Inventor: Walter Colombi, Bressanone (IT)

(73) Assignee: TAAUT S.R.L. GmbH, Bressanone (IT)

( * ) Notice: Subject to any disclaimer, the term of this patent is extended or adjusted under 35 U.S.C. 154(b) by 446 days.

(21) Appl. No.: 11/629,123

(22) PCT Filed: May 31, 2005

(86) PCT No.: PCT/IB2005/001517

§ 371 (c)(1),
(2), (4) Date: Dec. 11, 2006

(87) PCT Pub. No.: WO2005/121527

PCT Pub. Date: Dec. 22, 2005

(65) Prior Publication Data

US 2008/0302328 A1    Dec. 11, 2008

(30) Foreign Application Priority Data

Jun. 10, 2004    (IT)    .......................... BZ2004A0025

(51) Int. Cl.
*F02B 57/00*    (2006.01)
*F02B 75/26*    (2006.01)
*F02B 57/10*    (2006.01)
*F02B 25/00*    (2006.01)

(52) U.S. Cl. .................. 123/43 R; 123/47 R; 123/44 B; 123/44 D

(58) Field of Classification Search ............... 123/43 R, 123/44 R, 44 B, 44 C, 44 D, 51 B, 54.1, 54.2, 123/54.3
See application file for complete search history.

(56) References Cited

U.S. PATENT DOCUMENTS

| 984,358 | A | * | 2/1911 | Dawson | 123/43 R |
|---|---|---|---|---|---|
| 1,853,563 | A | * | 4/1932 | Hungerford et al. | 123/44 E |
| 1,871,589 | A | * | 8/1932 | Dainton | 123/47 R |
| 1,889,641 | A | * | 11/1932 | Dainton | 123/47 R |
| 1,990,660 | A | * | 2/1935 | McCann | 123/44 B |
| 2,014,672 | A | | 9/1935 | Schmal | 123/51 B |
| 2,260,975 | A | * | 10/1941 | Hvid | 123/51 B |
| 2,273,900 | A | * | 2/1942 | Sklenar | 123/44 D |
| 3,955,903 | A | * | 5/1976 | de Dobo | 418/61.3 |

(Continued)

FOREIGN PATENT DOCUMENTS

CH    601657 A5 *    7/1978

(Continued)

OTHER PUBLICATIONS

A Machine Translation DE 3730588 A1.*

(Continued)

*Primary Examiner*—Thai Ba Trieu
(74) *Attorney, Agent, or Firm*—Jacobson Holman PLLC

(57) ABSTRACT

A reciprocating/rotary piston engine includes a housing containing a pivotable rotor as well as a series of openings in which pistons move up and down. The rotor is made up of a rotary piston presenting a series of active surfaces between its vertices (two, four, six ... n active surfaces) corresponding to the number of rotary pistons and with corresponding active surfaces of the reciprocating pistons with alternately linkable chambers with a fuel supply, a carburation and an exhaust gas outlet.

13 Claims, 18 Drawing Sheets

U.S. PATENT DOCUMENTS 3,967,599 A * 7/1976 Townsend ................ 123/44 D
4,938,175 A * 7/1990 Matta ...................... 123/54.1
4,951,618 A * 8/1990 Wilson ..................... 123/54.2
5,090,372 A * 2/1992 Murray et al. ............ 123/44 B

FOREIGN PATENT DOCUMENTS

| DE | 2323009 | | 11/1974 |
|----|---------|---|---------|
| DE | 3730558 | A1 * | 2/1989 |
| DE | 10340670 | | 2/2004 |
| GB | 186729 | | 10/1922 |
| JP | 52050409 | A * | 4/1977 |

OTHER PUBLICATIONS

A Certified English Translation DE 2323009 A.*
A Fully Certified English Translation of DE 23 23 009 A1, Published on Nov. 28, 1974.*
A Fully Certified English Translation of DE 3730558 A1, Published on Mar. 2, 1989.*

* cited by examiner

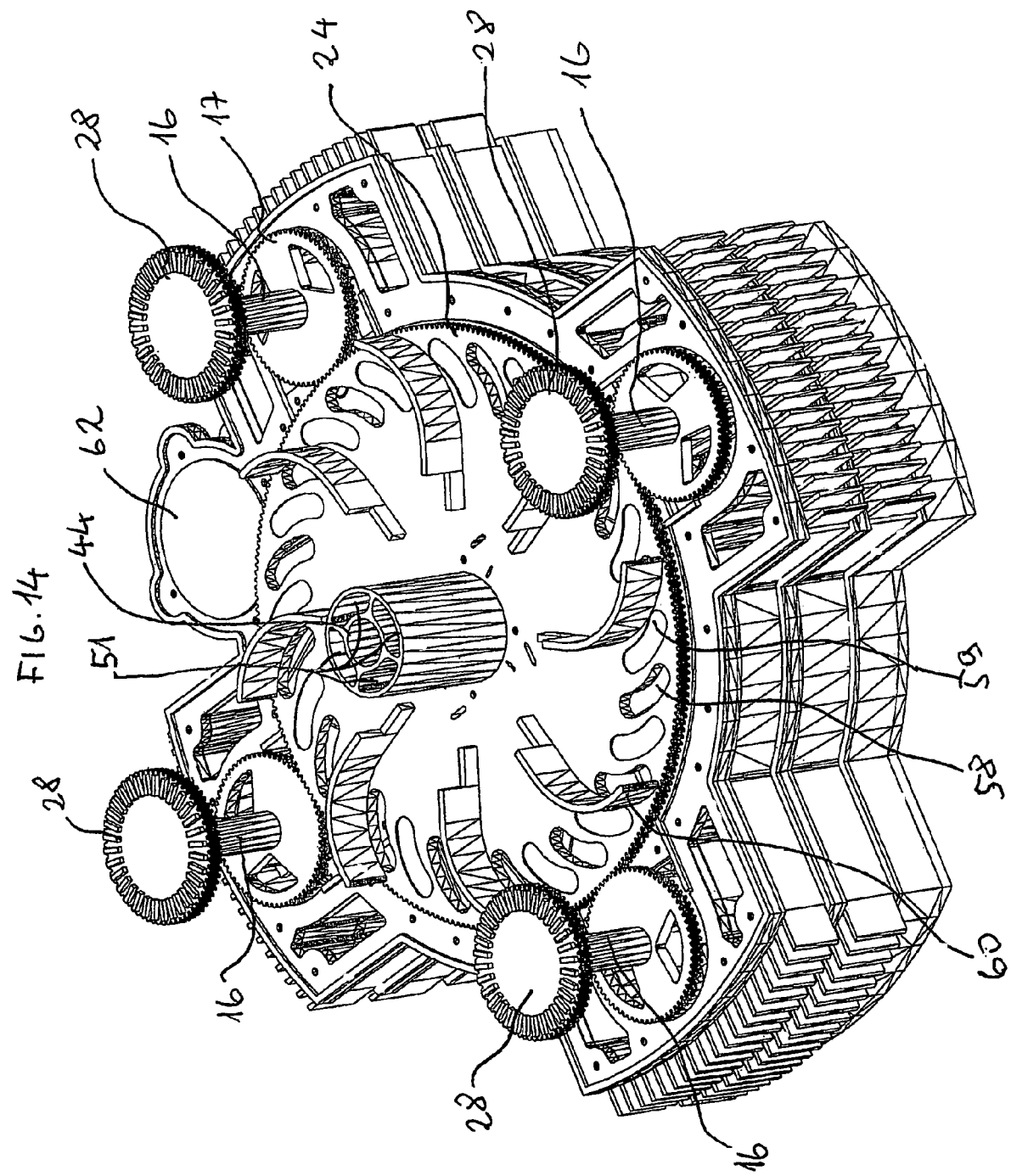

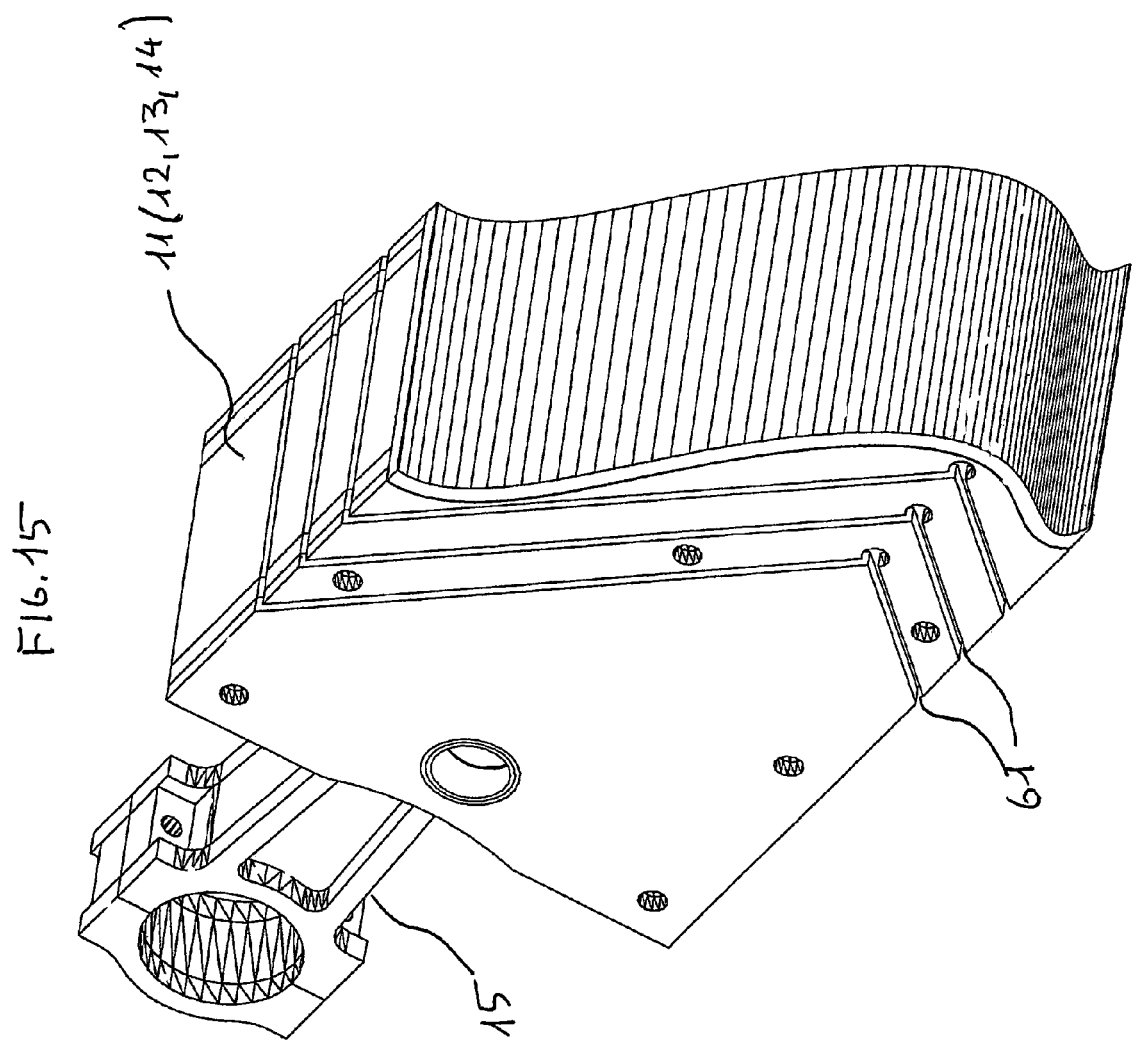

FIG. 16
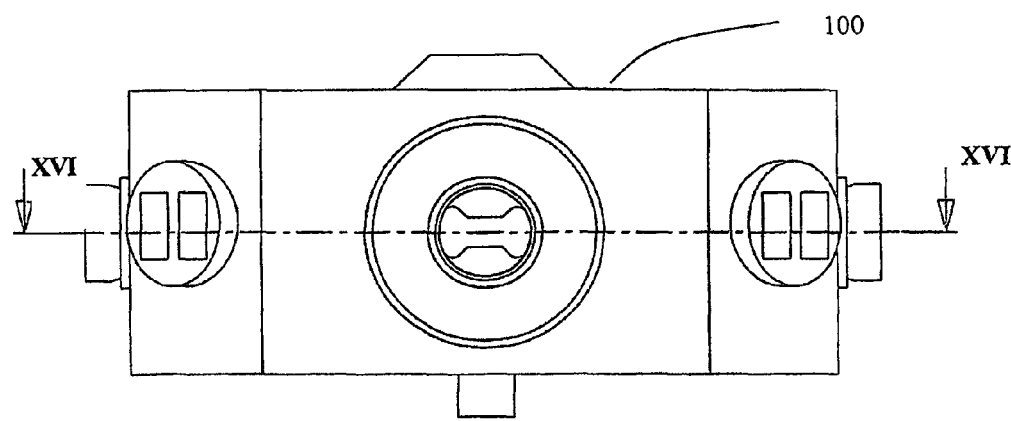
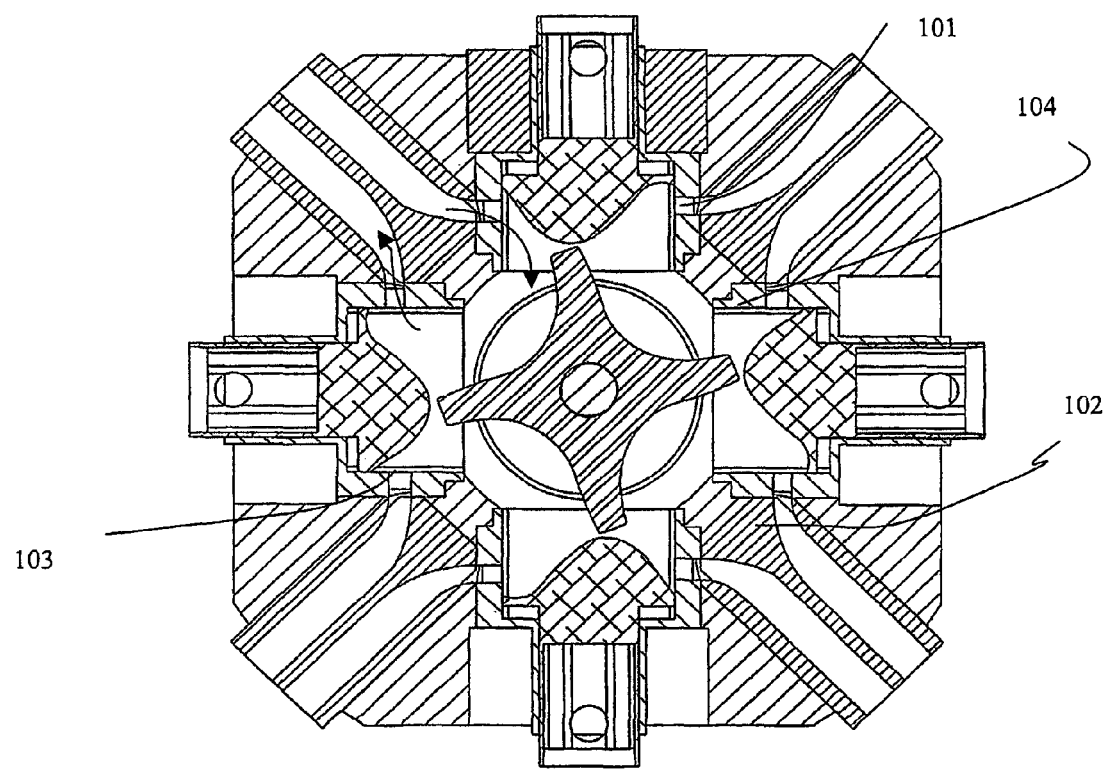
FIG. 17a

RECIPROCATING AND ROTARY PISTON ENGINE

This is a nationalization of PCT/IB2005/001517 filed 31 May 2005 and published in German.

FIELD OF THE INVENTION

It is an engine in which the rotary piston technology is combined in a new and ideal way with the reciprocating piston technology.

SUMMARY OF THE INVENTION

In comparison to the known internal combustion engines the present invention enables:
- a higher performance;
- the reduction of energy losses;
- a reduction of consumption with the same performance;
- a reduction of pollution when conventional fuels are used;
- a higher performance with the same engine size and the same kind of fuel;
- the realization of a more appropriate combustion chamber when using hydrogen as fuel;
- a higher torque;
- with the same performance, the realization of smaller engine housings with space saving geometries;
- the simplification of the engine technique with the consequent reduction of production costs;
- the reduction of the number of engine components;
- the reduction of the complexity of the single engine components;
- a more fluid and regular operation;
- the simplification of the cooling of the engine components;
- a more efficient configuration of the lubrication of the moving components;
- the reduction of lubricant consumption;
- the reduction to the minimum of the frictions of the whole system.

The listed advantages are described and justified in a more detailed way in the following description.

In order to facilitate the comprehensibility of the present invention, the concepts and definitions used in the description are those of the Wankel rotary piston engine and of the four-phase reciprocating piston engine.

Definitions

Reciprocating Piston Engine:
In the known reciprocating piston internal combustion engines, the piston has cylindrical features, the upper side determines the movable side of the combustion chamber. It moves up and down inside a cylindrical hollow volume (cylinder).

In the present application the reciprocating pistons moving up and down present a rectangular section, if not a square one; the upper side presents an undulated surface and is one of the movable as well as active sides of the combustion chamber; the profile of the upper side of the piston is calculated mathematically according to precise geometrical and kinematic ratios. These "prismatic" pistons move, similarly to the conventional pistons, up and down inside a prismatic cave volume. Rotary pistons- In the Wankel rotary piston engine the piston, also called rotor, is made up of a body with two averted, triangular sides; the sides of this triangle, i.e. the resulting sides, have a lightly convex surface. This body (rotative or rotary piston) is applied to an eccentric shaft which is put into motion through the rotation of the rotary piston.

The rotary piston described in the new application can be inscribed in a circle and have 4, 6, 8, . . . , N (N=even number) sides. The flanks corresponding to these sides are undulated, their profile can be determined mathematically as a function of the profile of the reciprocating piston upper flank. The rotation takes place centred on its own axis. Combustion chamber:

In reciprocating piston engines the breathing/combustion chamber is made up of a cylindrical hollow volume in which the cylindrical piston can be moved back and forth in the direction of the cylinder axis.

In the Wankel engine the rotor moves inside a hollow volume the upper and lower walls of which are approximately 8-shaped; the diameter of the rotary piston determines the height of this hollow volume. The rotor sides determine, through the eccentric rotation of the rotor, the accurate geometry of the combustion chamber. The opening between the rotor flanks and the 8-shaped profile of the container can alternatively serve as a breathing, combustion and ejection chamber when the corresponding volume is changed according to its function.

In the present application the combustion or breathing chamber is built by the geometrical coaction between the rotary piston in its rotation and the prismatic reciprocating piston in its bobbing movement. Similar to the Wankel engine, the diameter of the rotary piston and of the prismatic piston corresponds to the height of the combustion chamber. The upper and the lower flanks of the combustion chamber can be fixed to the rest of the chamber or can rotate alternatively as two disks or as crown gears fixed with them to the rotary piston. In this case the side walls guiding the rotary pistons represent the only fixed part of the system.

The indicated solution uses centrifugal force thus permitting to guide the lubricant towards the engine components which need it the most, while at the same time creating the conditions for a reduced lubricant consumption in comparison to the Wankel engine.

Geometrical configuration of the various engine components:

The geometrical configuration of the various engine components can be described as follows:

1. Rotary piston: it is located in the centre of the system and rotates on is own axis;
2. Reciprocating pistons: they are positioned according to a radial configuration around the rotary piston (rotor); their number corresponds to the number of undulated flanks of the rotor (for example in the FIG. 10 reciprocating pistons);
3. The axis of the reciprocating pistons can be pointed both in the direction or not in the direction of the centre of the system (theoretically the profile of the piston upper flank can be calculated for any direction). This means that the incidence of the axis of the reciprocating piston in the incidence point has an angle inferior to 90° (π/2) with respect to the tangent of the circle of the rotor.
4. The upper flank of the reciprocating piston is pointed in the direction of the rotary piston; each connecting rod of every single reciprocating piston moves its own crank shaft (drive shaft). The crank shafts are positioned at the margin of the system.

Kinematic and geometrical ratios between rotor and reciprocating pistons:

One rotation of the crank shaft in a system with four pistons corresponds to a fourth of the rotation of the central rotor (in a system with six pistons it corresponds to one sixth of a rotation etc.). In a system with four pistons the side walls of the movable chamber of a reciprocating piston are perpendicular to those of the adjacent piston. Generalizing we can say that with N-pistons the incidence angle between the pistons equals $2\pi/N$ (N=number of flanks of the rotor). In a system with six reciprocating pistons the incidence angle between the pistons thus equals 60° ($2\pi/6$), etc. The conditions described here have to be governed with millimetric precision by a gear wheel system. The rotor and the reciprocating pistons can touch each other only slightly or not at all.

P.S.: The rotor 3 is no cam because the carburation of fuel exerts its pressure both on one of the undulated flanks of the rotor and on the undulated flanks of two adjacent reciprocating pistons.

Mathematical Description of the System:

The formulas listed below clearly describe the geometry which both the arc-shaped flanks of the reciprocating piston and those of the rotary piston must possess. The formulae have been written to describe systems with rotors of 4 up to "N" flanks and thus a number of pistons of 4 up to "N".

These formulae are an integral part of the present invention: they are worthy of protection regardless of the application in the present invention.

a) The first part concerns the centred crank gear: this part belongs to the area of known contents of the present invention and aims at verifying how a fixed point of the piston linked to the cranked gear changes reference axis through a connecting rod in function of the angle of the crank with respect to the same axis. Even if it is a known subject, as obvious below, its application in the present description has original features.

b) The second part calculates the profile the piston must have, both as to the already calculated crank gear and to the translation in a point of the circle of the diameter "R" which inscribes the rotation of the rotor according to certain conditions with the movement of the crank. The equation of the sought bending is expressed in two ways:
   1. explicitly y=f(x)
   2. as a parameter as to "x" and "y" in order to enable the transfer of the data to a drawing programme CAD.

c) The third part calculates the profile the rotor flanks must have, the following causality is represented and described mathematically.

Let's assume:
   that originally the rotor is a simple disk with diameter "R";
   that this disk revolves according to a given law linked to the movement of the piston;
   that because of the features of both the incidence, described in (b), and of the profile calculated with the procedure delineated in (b), the piston advances in direction of the circle according to the laws calculated in (a);
   that the action carried out by the piston is comparable to the tool of a lathe which prepares the rotor
   It will appear that the turning operation will create the profile of the sought rotor flanks.

P.S.: The curves expressed by the following functions have the degree of approximation/accuracy inherent to mathematics. Because the movable parts can only touch each other slightly or not at all, in the practical process of design tolerances have to be used which have to be changed case-by-case according to the features of the materials used to produce the engine, but they are not included in the description.

a) Crank Gear

Let's assume a reference system originating in the centre of rotation of the crank (FIG. 1) and with:
   xy=the reference system of crank-system with origin in pivot point of crank
   r=crank length (radium)
   d=connecting rod length
   $\phi$=angle of the crank with respect to the reference axis (expressed in radians)
with:
$l_1 = r \cos \phi$
$l_2 = r \sin \phi$ The piston moving along the axis y describes positions according to the change of the $\phi$ (FIG. 1) given by:
$y = -l_1 + \sqrt{d^2 - l^2}$
$y = -r \cos \phi + \sqrt{d^2 - r^2 \sin^2 \phi}$
with $0 \leq \phi \leq \pi$
and with $-\pi \leq \phi \leq 0$ Taking into account that:
O=starting point of the connecting rod-end point with angle $\phi = 0$
$\phi = 0$ $y = -r + d$ (minimum position=O)
$\phi = \pi/2$ $y = \sqrt{d^2 - r^2}$
$\phi = \pi$ $y = r + d$ (maximum position=A)
"A" represents the arriving point.

The equation of the piston movement will thus be as follows:

$$y = -r \cos \phi + \sqrt{d^2 - r^2 \sin^2 \phi} = f(\phi)$$

b) Calculation of the Piston Profile

The calculation of the profile is obtained by bringing into relation the already calculated crank gear with the translation of a point on the circle inscribing the rotation of the rotor: this relation corresponds to the given movement conditions and is the object of the present invention.

The functions expressed below enable the calculation of piston/rotor systems regardless of the number of pistons, but this number must be higher than 2. The systems for which the application of the present invention makes sense have an even number of cranks with a minimum of 4.

In addition to the technologies already mentioned, other technologies are defined, being:
$\psi$=the circle inscribing the rotor;
XY=the reference system on which $\psi$ is centred, i.e. the rotor;
R=radius of the circle $\psi$;
N=number of rotor flanks=number of crank gears=number of partitions of the circle $\psi$;
i=incidence line of the piston applied on the middle point of the corresponding arc;
$P_1$=it designates the incidence point of the line "i" on the circle $\psi$;
$P_3$=it designates the end of the first arc of $\psi$ of the corresponding piston;
$\alpha$=incidence angle of the piston measured in the point $P_1$ with respect to the tangent of this circle, crossing the same point;
L=arc of $\psi$ of a corresponding piston, between $P_2$ and $P_3$ of the extent (or length) $2\pi/N$;
C=chord "L", drawn between $P_2$ and $P_3$; this chord is parallel to the tangent of $\psi$ crossing $P_1$;
S=piston width=calculation area of the piston profile=distance between two lines running parallel to the incidence line "i" and applied to the points $P_2$ and $P_3$;
s=lag angle: it is the incidence angle of the piston, measured with respect to the axis X of the reference system XY of $\psi$;
m=line crossing the point $P_1$ from the centre of the rotor:
$\beta$=it is the angle between the line "m" and the line "i": it is the first orthogonal line to the tangent of $\psi$ crossing $P_1$, this angle is always=$\pi/2 - \alpha$ Development The relation between the rotation of the engine and the rotation of the crank has always to be understood according to the following principle:

1:1/N (with N—even number—2, 4, ...), and the reference to the corresponding angle=n (crank gear) is: n($\psi$)/N.

It means that:

The piston, starting from $P_1$, carries out for $0 \leq \phi \leq \pi$ of the crank gear a width in the direction of the point $P_3 = \pi/N$. The foregoing width, i.e. from $P_2$ to $P_1$, is carried out and the crank gear $-\pi \leq \phi \leq 0$.

In order to write the equations, a reference system xy is taken into account which is fixed to the described movement with the crank gear and forms an angle to $\psi$ with the x-axis (Y) "i" (FIG. 2): the result is the equation composed by two movements:

a constant movement of a point moving on $\psi$ according to the criteria stated above
$\pi$ (crank gear): $\pi(\psi)/N$;
the movement of a point in the base of the crank gear.

The equation describing the abscissa $$x = R \sin(\phi/N + \beta) - R \sin \beta$$

(FIG. 5)

The equation describing the ordinate:

$$y = R \cos \beta - R \cos(\phi/N + \beta) + d - r + 1 - f(\phi)$$

(FIG. 5)

where "1" is the distance between y and the origin of the system xy (or, in non mathematical concepts, the length of the pistons) and $f(\phi)$ the equation of the crank gear (or the piston movement).

$$y = \boxed{R\cos\beta - R\cos(\phi/N+\beta)} + \boxed{d} - r + \boxed{1 - f(\phi)}$$

minimum position of the crank gear equation crank gear

The equations found also work for $\phi$ negative.

$$\begin{cases} x = R(\sin(\varphi/N + \beta) - \sin\beta) \\ y = R(\cos\beta - \cos(\beta/N + \beta)) + d - r + r\cos\varphi - \sqrt{d^2 - r^2 \sin^2\varphi} \end{cases}$$

FIGS. 6a and 6b represent the determination of the width S of the piston and more precisely for the piston width with N>4 in FIG. 6a and for the piston width with N=4=$\pi/2$.

The angle between the line crossing the line "i" through $P_2$ and the string "C" equals $\beta$ Equation of the string linking $P_2$ and $P_3$:

The following relations can be extrapolated from the graphic (FIGS. 6.a and 6.b):

$f_1 = R \sin(2\pi/N)$
$f_2 = R \cos(2\pi/N)$
$f_3 = R - R \cos(2\pi/N)$

The arc will thus equal:

$$C = \sqrt{(R - R\cos(2\pi/N))^2 + (R\sin(2\pi/N))^2}$$

the width "S" of the piston is expressed as follows:

$$S = C \cos \beta$$

Calculation of the profile of one flank of the rotary piston:

The calculation principle as to the curve of the rotary piston is more complex than the calculation of the curve of the reciprocating piston.

As mentioned already, we have to assume that the reciprocating piston comes from a given point of its movement in a way that its curve begins to build the form of the rotary piston. Taking this into consideration, the calculation of the rotary piston profile can be expressed as a problem of a "minimum". Following this calculation hypothesis we reach an equation which cannot be expressed.

The way chosen to determine the coordinates to guide numerical control machines was only, to describe all passages in trigonometric terms, the one which was followed in geometrical terms during the creation of the drawing.

The mathematical components necessary for the calculation are as follows:

a) the reversed crank gear=$f(\epsilon)$. While the crank gear calculates the translation of the margin of the connecting rod as the angle $\phi$ changes, the reversed crank gear provides the translation of the extremity of the connecting rod as the angle $\pi - \phi = \epsilon$ changes.

b) the distance "e": distance between the origin of the reference system of the rotor "XY" from the various points of the curve of the reciprocating piston, calculated as the angle $\phi$ moves in the direction of the movement of the reciprocating piston with a distance equalling the above mentioned "reversed crank gear" $f(\epsilon)$. The segment between the origin XY and each point of the piston is called "E".

c) the new coordinates of the outermost point of the segment "E" of the length "e", calculated under the application of a rotation=$\pi/N$. In order to carry this out, it is necessary to calculate the angle $\eta$ between the line "E" and the line crossing the origin of the system parallel to the line "i".

P.S.: Another reference system called X'Y' is centred on the reference system XY and is rotated of an angle "s" with respect to the reference system XY.

a) the reversed crank gear is calculated from the crank gear $f(\phi)$ taking into account the fact that the angle is $\epsilon = \pi - \phi$ (see FIG. 7).

Remembering that $$f(\phi) = -r \cos \phi + \sqrt{d^2 - r^2 \sin^2 \phi}$$

in a similar way it will result that:

$$f(\epsilon) = -r \cos \epsilon + \sqrt{d^2 - r^2 \sin^2 \epsilon} + d - r = r \cos \phi + \sqrt{d^2 - r^2 \sin^2 \phi} + d - r$$

b) Determination of the coordinates of the outermost point of the segment "E" originating in XY and calculation of the length "e" of the line "E".

The coordinates of the point "E" are (see FIG. 8):

$$X' = R \cos \beta - (f(\phi) + f(\epsilon))$$

$$Y' = R \sin(\phi/N + \beta)$$

The length "e" of the line "E" is thus:

$$e = \sqrt{(R\cos\beta - (f(\phi) + f(\epsilon)))^2 + (R\sin(\phi/N + \beta))^2}$$

c) Calculation of the curve of the rotor

In the first passage the angle $\eta$ between "E" and X' is calculated.

Given that $$e \sin \eta = R \sin(\phi/N + \beta)$$

FIG. 8 the angle can be expressed as follows:

$$\eta = \arcsin\left(\frac{R \sin(\varphi/N + \beta)}{e}\right)$$ Figure 8

If on the segment "E" of the length "e" a rotation=ϕ/N is applied, the result are the coordinates of the points of the rotor components corresponding to the piston, if the following is taken into account as to the reference system X'Y':

$X'=e \cos(\eta+\phi/N)$

FIG. 8

$Y'=e \sin(\eta+\pi/N-(\pi/N-/N))$

FIG. 8

The curve of the rotor component at issue corresponds to the curve part for which the following condition is true:

e<R

In short, the equation of the rotor at issue is determined as follows:

$$\begin{cases} X' = e\cos(\eta + \varphi/N) \\ Y' = e\sin(\eta + \varphi/N) \end{cases}$$

The points of the curve segments for e>R are excluded.
In explicit form, the curve has the following equation $Y'=X'tg(\eta+\phi/N)$ Functional schematic as continuous-flow machine with superimposed control (2-phase-system):

a. the two phases: similar to the conventional 2-phase engines, in this system as well the cycle is subdivided into the usual phases of a 2-phase engine:
  1.2. 1.1. Inlet through inlet slit for the air-fuel mix, but without mixing lubricant oils, neither by supplying the mix from the crank shaft housing nor by compression (reduction of the volume through closed slits).
  2.1. Ignition with carburation (increase of the volume through carburation with energy production)
  2.2. Discharge through outlet slits thanks to the outlet acceleration caused by the exhaust pipe. With this system it is however possible to let only fresh air enter through the inlet slits and to mix the possible fuels through direct injection into the combustion chamber. These solutions are known in conventional 2-phase engines and can be transferred to our system.

With this system it is however possible to let only fresh air enter through the inlet slits and to mix the various fuels through direct injection into the combustion chamber. These solutions are known in conventional 2-phase engines and can be transferred to our system.

Ignition: As distinct from 4-phase systems, in this continuous flow machine a corresponding spark plug is mounted in each incidence point of the side flanks of the moving chamber of the reciprocating pistons: four spark plugs are thus necessary in a 4-piston system (number of spark plugs=number of rotary piston sides)

P.S.: The spark plugs are necessary when fuel which needs to be ignited is used; diesel is not appropriate for this solution as it is almost impossible to reach the necessary compression. However with the concept of the continuous flow machine we can aim at solutions which can take advantage of the self ignition of fuels: with gas fuels it is possible to reach very low emission levels.

Conventional nozzles or spark plugs can be used.

Temporal sequence of the ignition:

In internal combustion engines with reciprocating pistons, the crank shaft carries out a rotation during a two-phase-cycle of a piston, i.e. a single ignition. In conventional alternative piston engines, a rotation of the eccentric or crank shaft is necessary for a two-phase cycle with an ignition of a piston.

In the Wankel engine, with each complete rotation of the rotor the eccentric shaft carries out three complete rotations. During each complete rotation of the rotor, three complete four-phase cycles with three ignitions are carried out. Three ignitions carry out three rotations of the eccentric shaft.

In the present invention with the alternative as continuous flow machine with 2-phase cycle, the spark plugs work at the same time: four spark plugs are thus working at the same time as four reciprocating pistons. During a complete rotation of the rotor the spark plugs work four times: a total of 4 spark plugs*4=16 ignitions for each complete rotation.

The engine body of the present invention, comparable to the Wankel engine, improves the ratio between ignitions and rotation with the drive shaft from 1:1 (1 ignition/carburation for each rotation of the drive shaft) to 16:1 (8 ignitions/carburations for each rotation of the engine shaft/rotor): the efficiency of the engine is thus remarkably improved.

In the present invention energy is transferred directly as the engine shaft is fixed on the rotor; in the Wankel engine energy is transferred through frictions between rotor and eccentric shaft. In the present invention each rotation of the crank shafts of the reciprocating pistons is linked to an ignition; the work of all the 4 spark plugs present in the engine (if it is a 4-piston engine) enables the concurrent movement of all the 4 pistons of the system, which are thus loaded in the same way.

The part of the present invention which can be compared to a conventional reciprocating piston engine almost doubles the efficiency.

The combination of both the above mentioned systems (rotary piston and reciprocating piston) realized in the present invention enables a more logical and uniform flow of the whole drive system.

Functional schematic with 4-phase-system:

a. the four phases: similar to the conventional engines, in this system as well the cycle is subdivided into the following four phases:
  1. Inlet (expansion of the volume of the mix with open inlet valves)
  2. Compression (reduction of the volume with closed valves)
  3. Ignition with carburation (carburation of the volume with production of kinetic energy)
  4. Discharge (reduction of the volume with open exhaust valves).

The valve system is located in the rotor; inlet and outlet of the exhaust gases are carried out by a system of collecting ducts obtained (milled) in the rotor.

b. Injection: if you do not choose a system with direct injection, this is the most appropriate solution for the application of the present invention. A fuel injection nozzle expressly designed can be positioned inside the air inlet duct positioned axially to the rotor.

c. Ignition: a spark plug (32) is mounted for each couple of pistons in the incidence point of the side flanks of the moving chamber of the reciprocating piston: two spark plugs are necessary in a system with four pistons (number of spark plugs=number of rotor flanks/2).

P.S.: The spark plugs are necessary in case of fuels needing ignition by spark; in this case fuel injection nozzles can be used, similar to those of the known fuel injection nozzles Common Rail which substitute the spark plugs.

Conventional spark plugs or industrial fuel injection nozzles can be used with little adaptation. In this case the compression is reduced. Otherwise components such as fuel injection nozzles or spark plugs have to be developed for this engine.

Temporal sequence of the ignition:

In internal combustion engines with reciprocating pistons the crank shaft carries out two rotations during a four-phase-cycle of a piston, i.e. a single ignition.

In the Wankel engine, with each complete rotation of the rotor the eccentric shaft carries out three complete rotations. During each complete rotation of the rotor, three complete four-phase cycles with three ignitions are carried out. Three ignitions carry out three rotations of the eccentric shaft.

In the present invention the spark plugs work at the same time: two spark plugs are thus working at the same time as four reciprocating pistons. During a complete rotation of the rotor the spark plugs work four times: a total of 2 spark plugs*4=8 for each complete rotation.

The engine body of the present invention, comparable to the Wankel engine, improves the ratio between ignitions and rotation with the drive shaft from 1:1 (1 ignition/carburation for each rotation of the drive shaft) to 8:1 (8 ignitions/carburations for each rotation of the engine shaft/rotor): the effectiveness of the engine is thus remarkably improved, at least quadrupled.

In the present invention energy is transferred directly as the engine shaft is fixed on the rotor; in the Wankel engine energy is transferred through frictions between rotor and eccentric shaft. In the present invention each rotation of the crank shafts of the reciprocating pistons is linked to an ignition; the work of the two spark plugs present in the engine (if it is a 4-piston engine) enables the concurrent movement of all the 4 pistons of the system.

The part of the present invention which can be compared to a conventional reciprocating piston engine almost doubles the efficiency. Although the present invention includes a four-phase cycle, the kinematic and thermal behaviours are comparable to those of a two-phase engine.

The combination of the two above mentioned systems (rotary piston and reciprocating piston) realized in the present invention enables a more logical and uniform flow of the whole drive system.

Conclusive Remarks

The foregoing description summarizes the technical principles of the reciprocating/rotary piston engine. In particular, the invention of new engine kinematics was described, which provides a higher efficiency factor as compared to the conventional engine and which is characterized by a constructive simplification of the single system components.

BRIEF DESCRIPTION OF THE DRAWINGS

Further characteristics and details of the engine being the object of this invention can be inferred from the Claims and from the following description of a preferred embodiment represented in the attached drawings. The drawings represent:

DETAILED DESCRIPTION OF PREFERRED EMBODIMENTS

Figure 1:
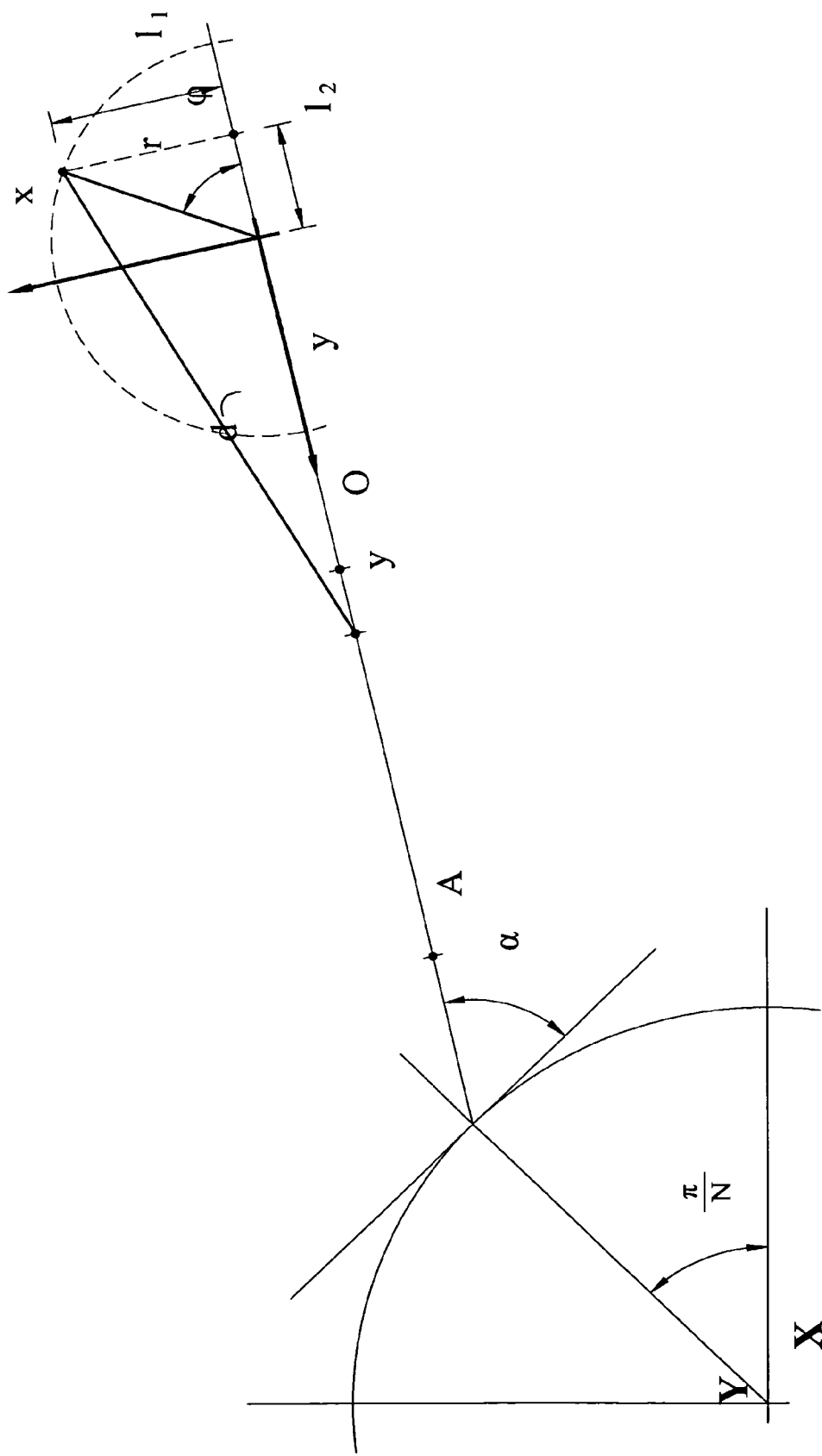
FIG. 1—the reference system xy of crank-system with origin in pivot point of crank and reference system on which rotary piston rotates, FIG. 2—broadly defined relationship between reference system xy (crankshaft) and reference system XY, FIG. 3—detail description of relationship between reference system xy (crankshaft) and reference system XY (rotary piston) by a 4-face rotary piston and 4 peripherical reciprocating pistons, FIG. 4—detail description of relationship between reference system xy (crankshaft) and reference system XY (rotary piston) by a 6-face rotary piston and 6 peripherical reciprocating pistons, FIG. 5—description of symbol $\square = R \cos \beta - R \cos(\phi/N + \beta)$ and between reference system xy (crankshaft) and reference system XY (rotary piston), FIG. 6a—extract of a sector for calculating the width of reciprocating piston by a 6-face rotary piston and 6 peripherical reciprocating pistons, FIG. 6b—extract of a sector for calculating the width of reciprocating piston by a 4-face rotary piston and 4 peripherical reciprocating pistons, FIG. 7—top image is like FIG. 1 ($l_1$ and $l_2$ are interchanges), FIG. 7—bottom image—the reference system xy of crank-system with origin in pivot point of crank and description of the movement of rod, FIG. 8—description of the translation of the reciprocating piston curve for the approximate calculation of the rotary piston's profile, FIG. 9 a section in a plane containing the rotation axis of an engine based on the invention in a first embodiment as a four-phase engine, FIG. 10 a section of the engine based on the invention like FIG. 9, FIG. 11 a perspective view of the engine based on the invention, some details on the rotary have been partly omitted, FIG. 12 a view like FIG. 11, but without the lower crown gear, FIG. 13 a view like FIGS. 11 and 12, but only with the valve bodies, FIG. 13a a perspective view of the valve bodies and of The side bushes of the pistons, FIG. 14 a view like FIGS. 11 to 13, but outside the combustion chamber of the engine, and FIG. 15 a perspective view of a reciprocating piston, FIG. 16 a top view of a reciprocating/rotary piston engine based on the invention in a second embodiment as a two-phase engine, and FIG. 17 sections along the intersection line XVI-XVI Of FIG. 16, in the positions of FIGS. 17a, 17b, 17c and 17d, where the sections of the positions in FIGS. 17b), 17c) and 17d) are represented in reduced views.
Figure 2:
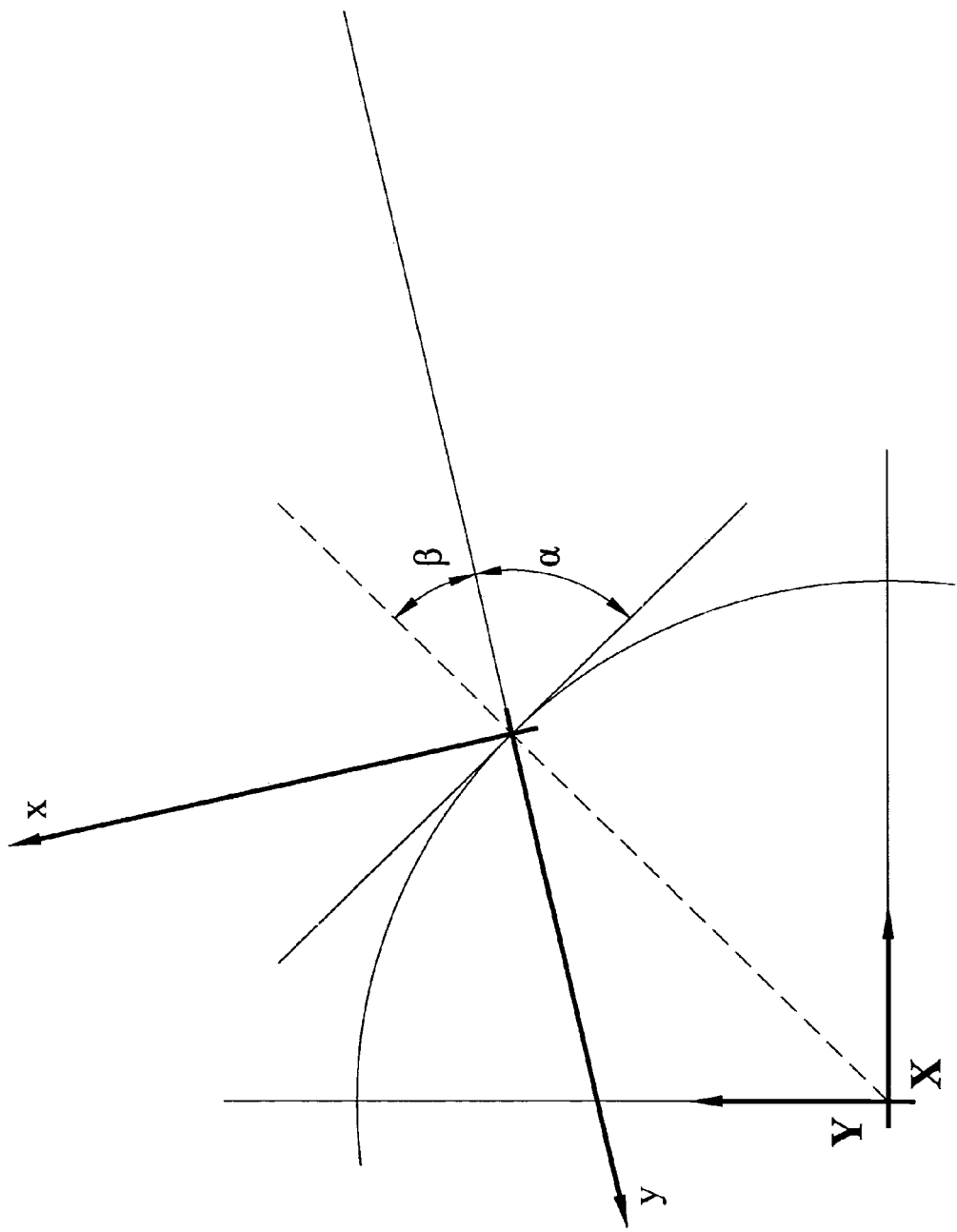
Figure 3:
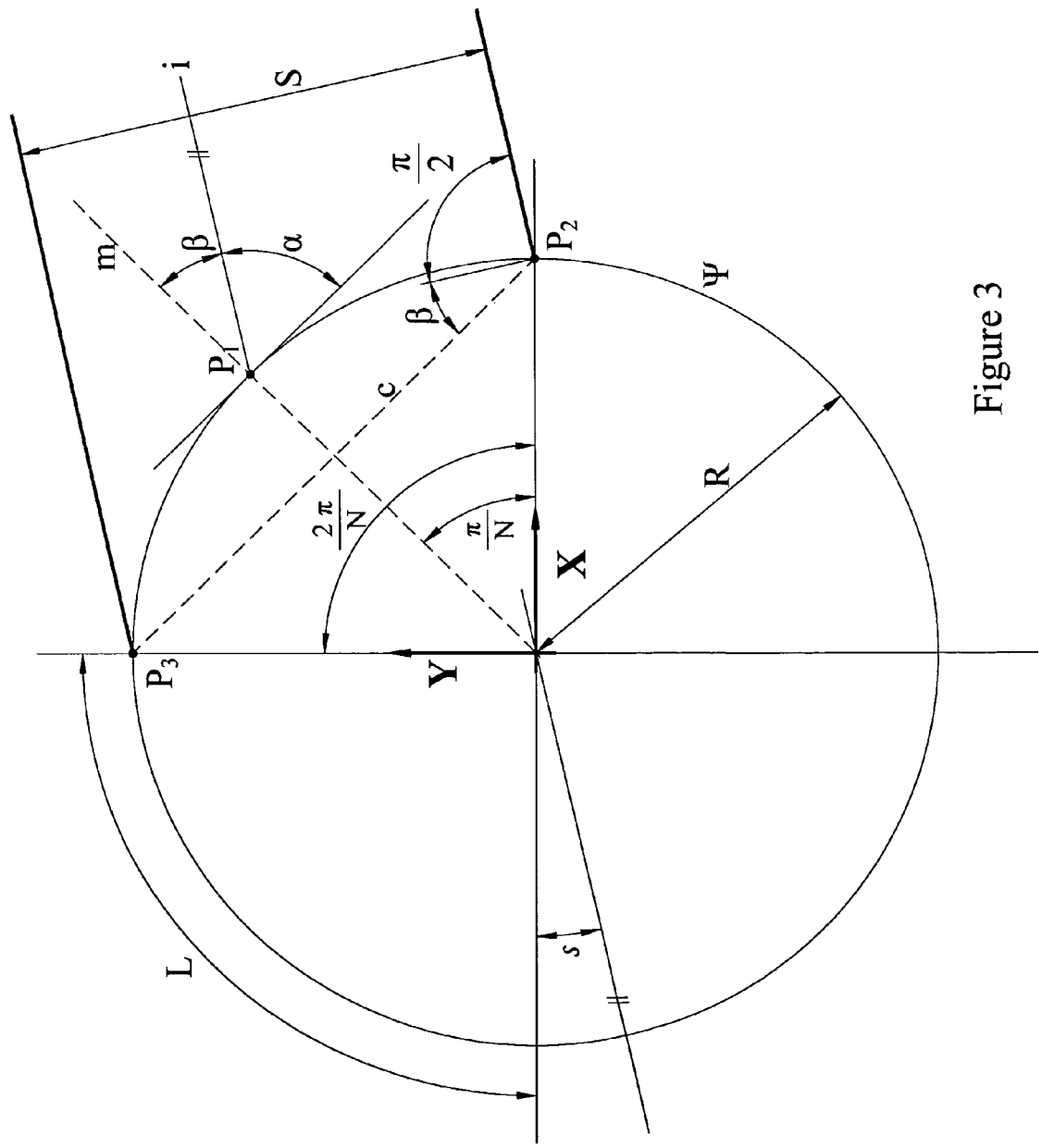
Figure 4:
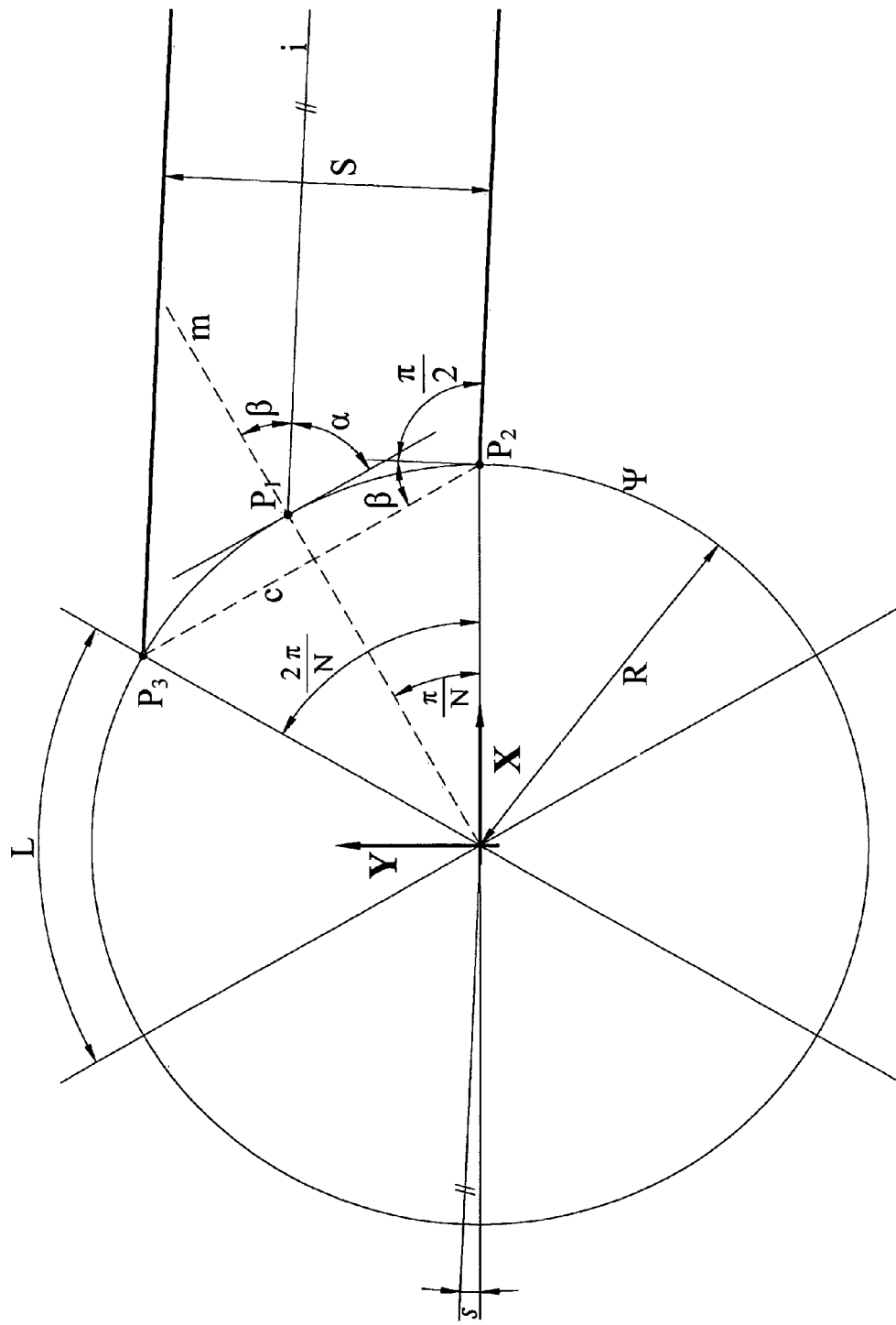
Figure 5:
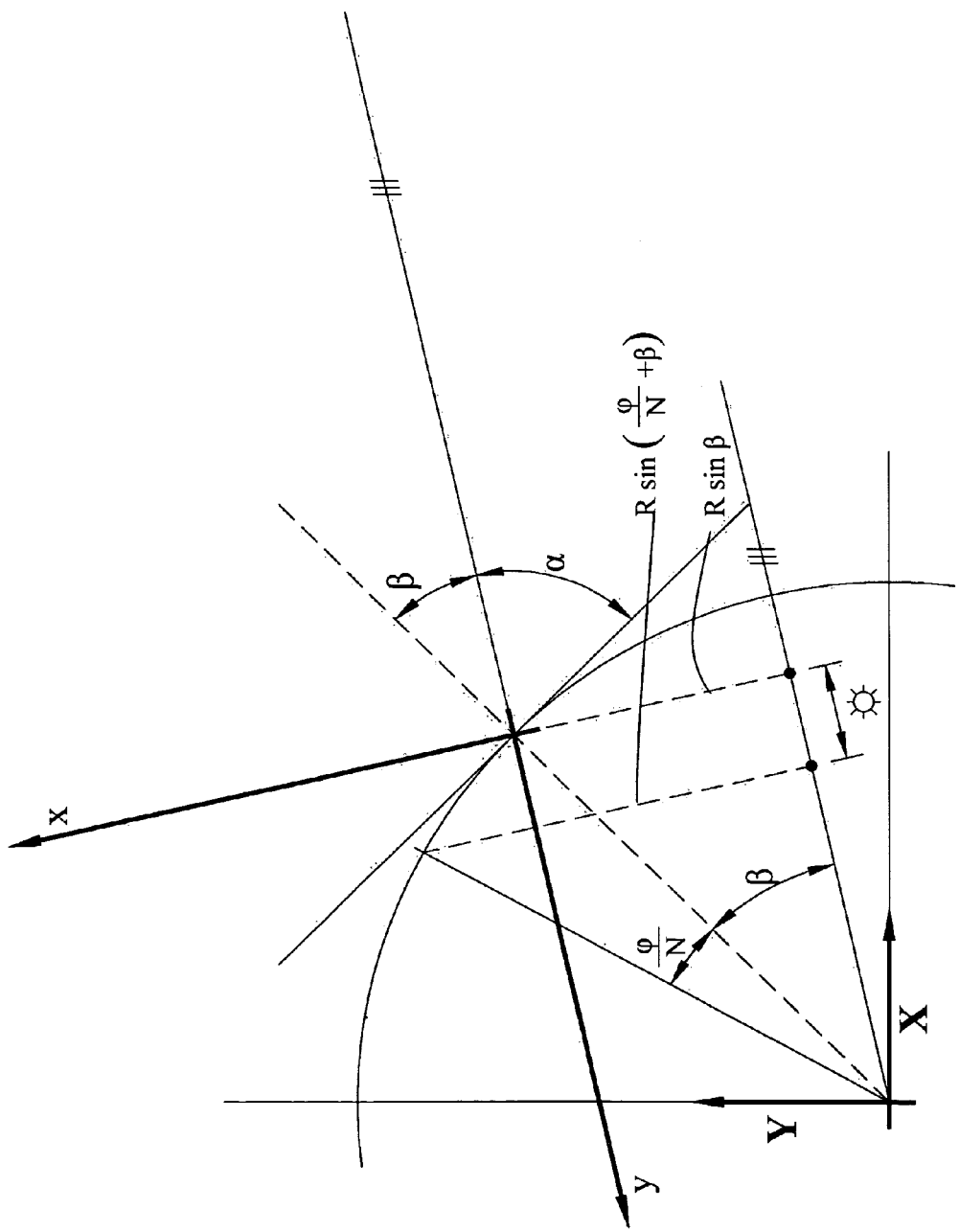
Figure 6B:
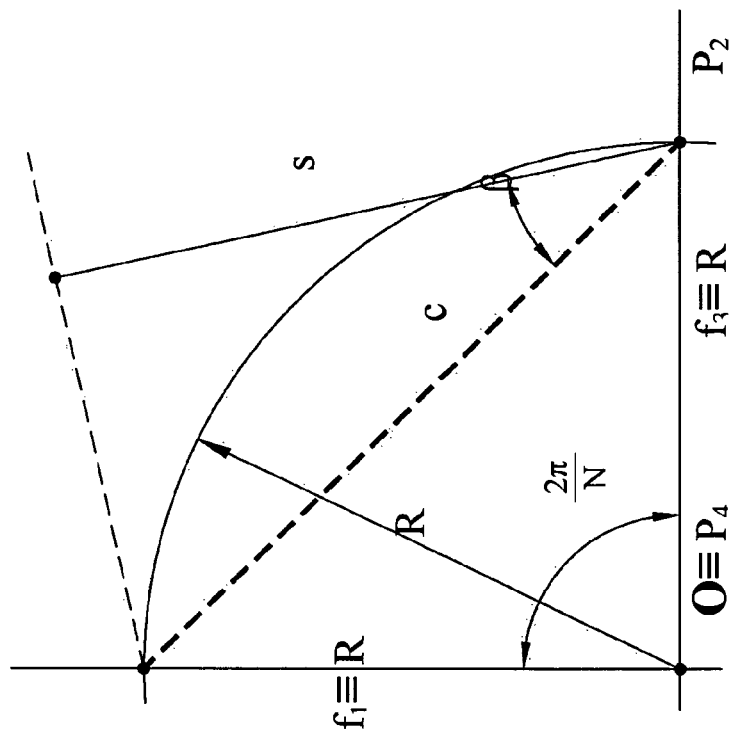
Figure 6A:
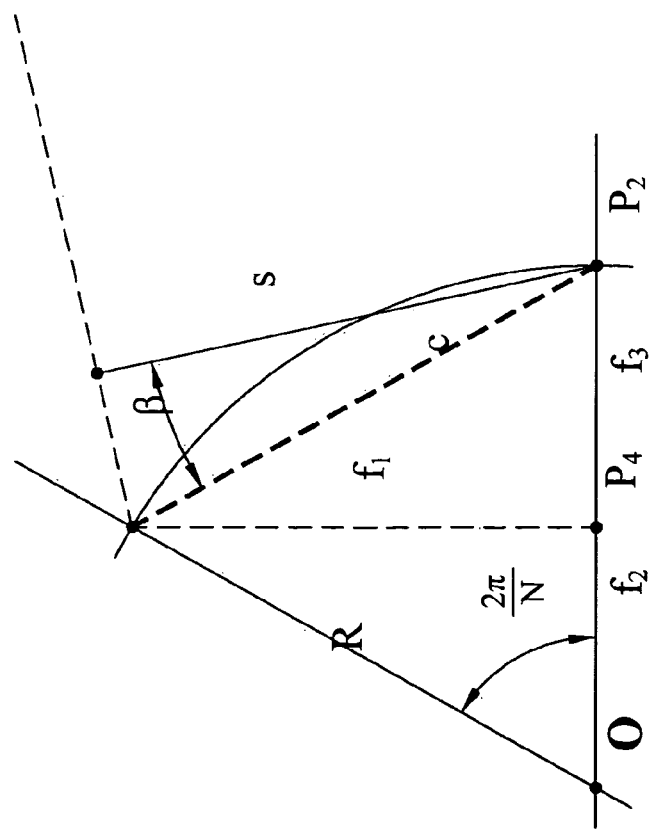
Figure 7:
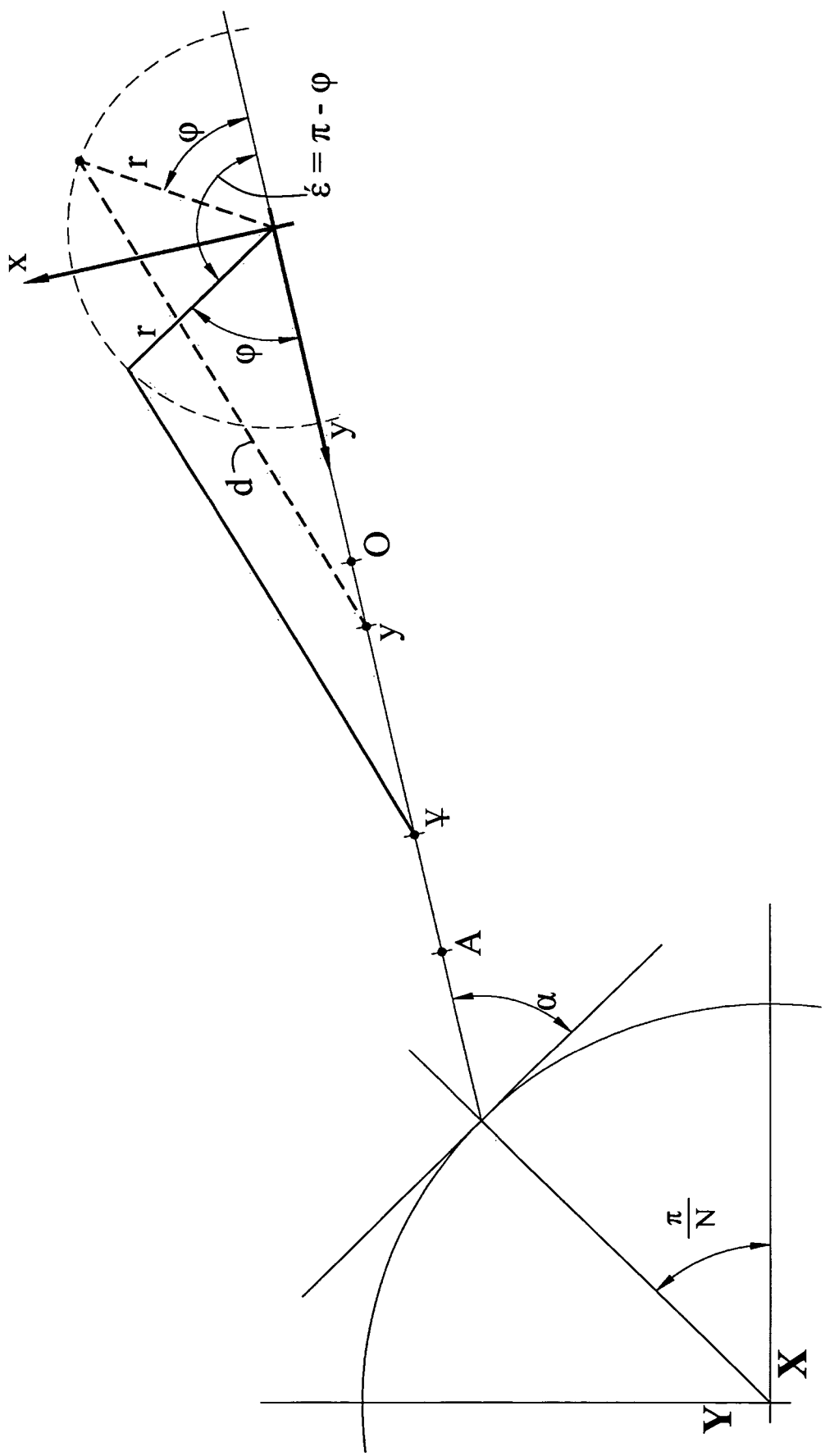
Figure 8:
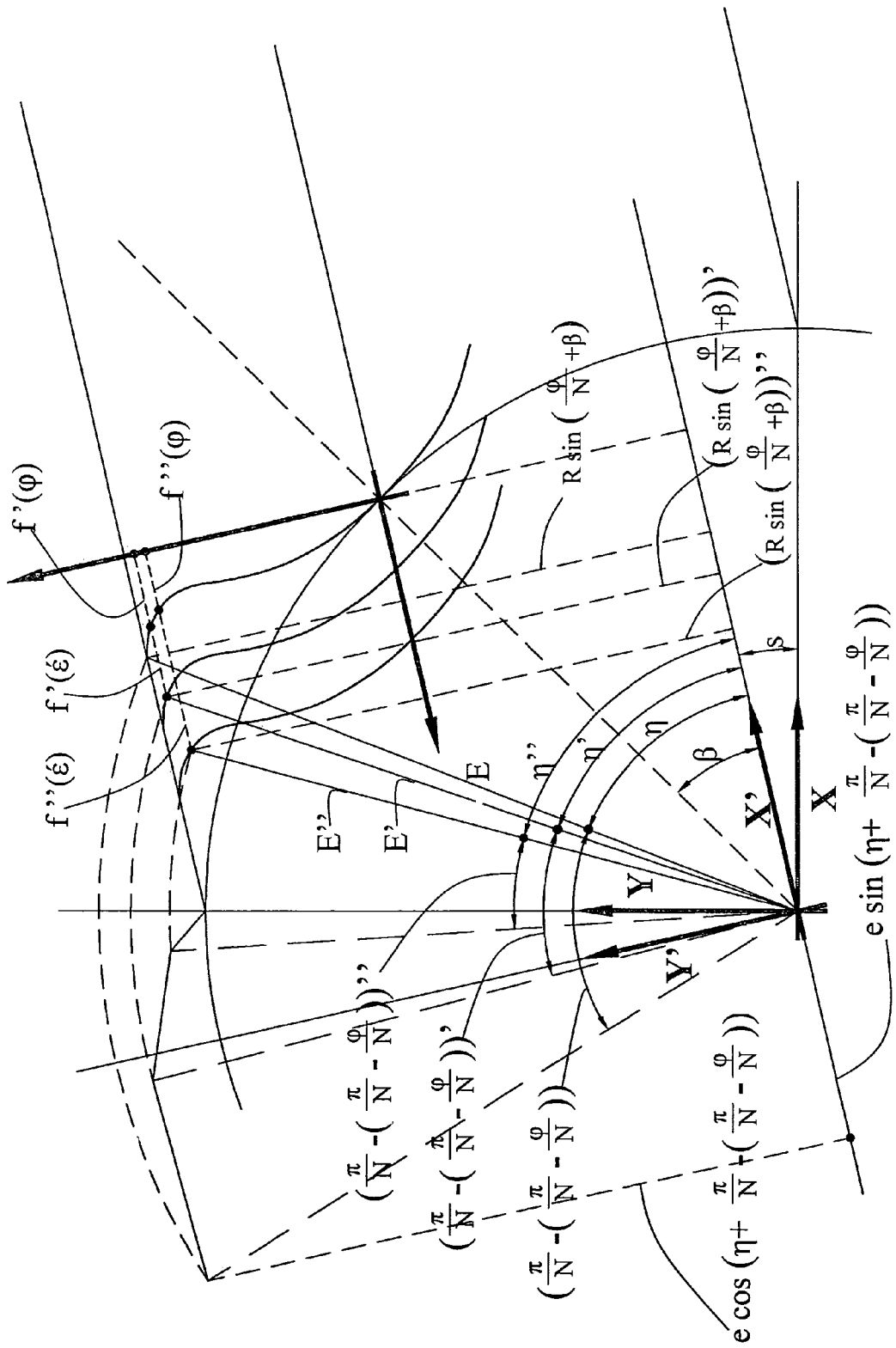
Figure 9:
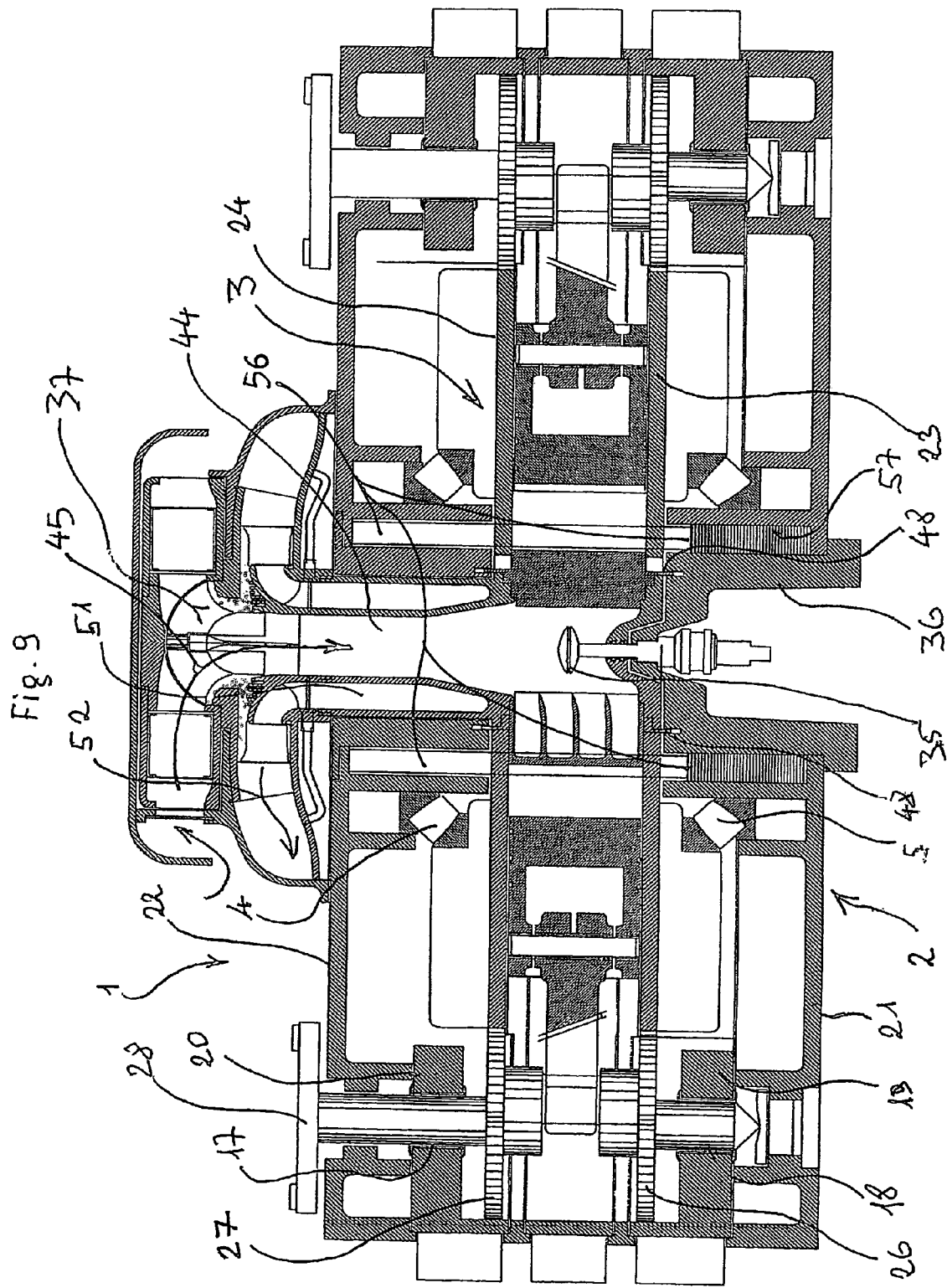

FIG. 9 represents in the reference number 1 the whole of a reciprocating/rotary piston engine based on the invention. It includes a housing 2 and a rotor 3 positioned in the housing 2 through bearings 4 and 5. The bearings are represented in this case as tapered roller bearings.

Figure 10:
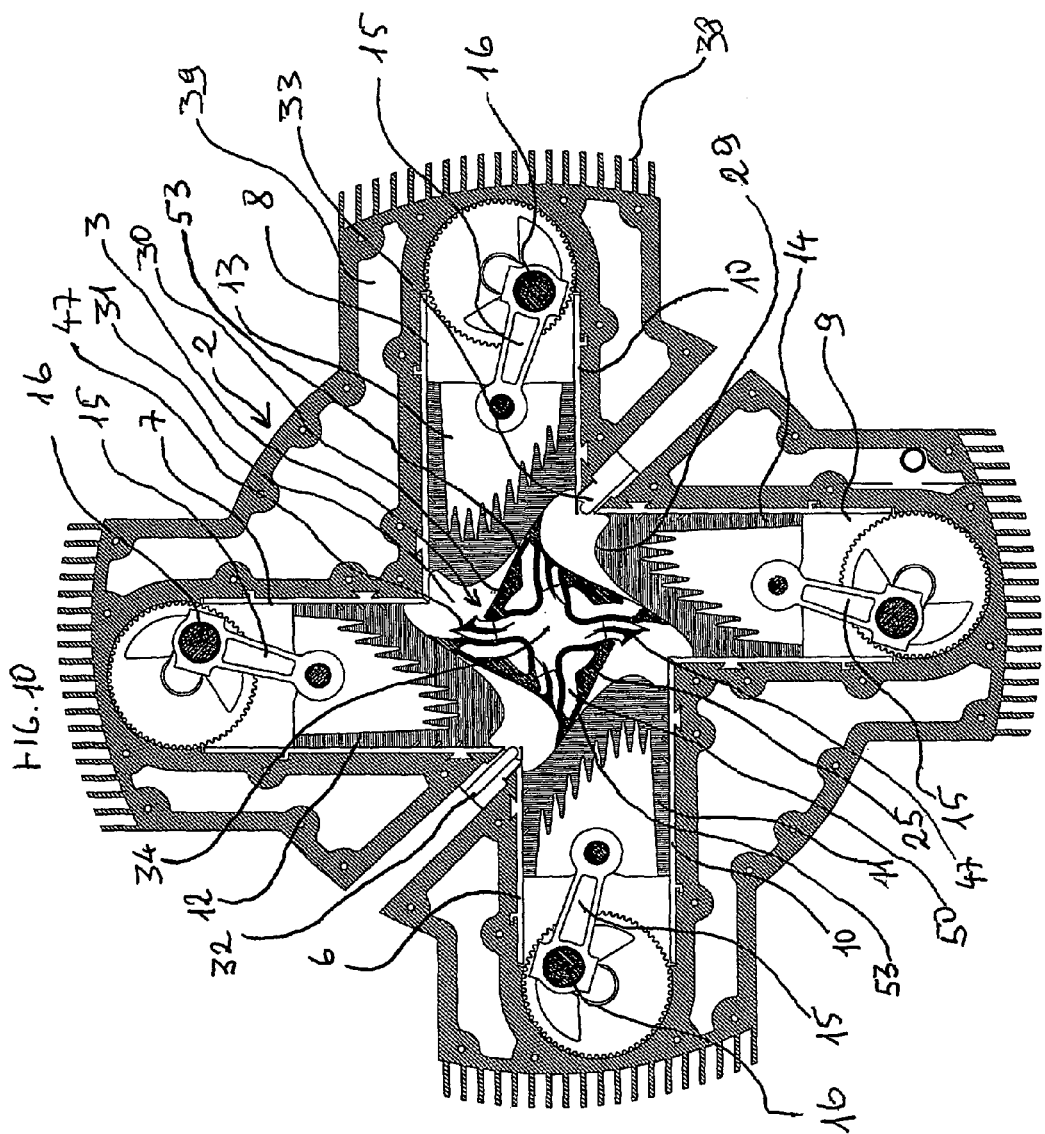

In the housing 2 there are the openings 6, 7, 8 and 9 (FIG. 10), each of which presents a coating. The main axis of each opening is perpendicular to the adjacent opening and openings being parallel to each other have parallel shifted axes.

A piston 11, 12, 13 and 14 moves in the corresponding opening 6, 7, 8 and 9. Each piston is articulated to a connecting rod 15 articulated to a crank shaft. The crank shafts 16 are arranged pivotally in bearings 17 and 18 outside the openings 6, 7, 8 and 9 in a ring of the housing consisting of a bearing seat 64, an appendix of housing 2, and a mounting bracket 19 and 20 which is represented schematically in its ledges 19 and 20 supporting the bearings 17 and 18. The housing 2 is closed on the outside by covers 21 and 22 catching lubricants and thus serving also as oil sump.

Each opening 6, 7, 8 and 9 is closed on the side, perpendicularly to the rotation axis of the rotor 3, by a crown gear 23, 24. A rotary piston 25 is positioned between the crown gears 23 and 24 and fixed to them. Every crown gear 23 and 24 engages with a gear wheel 26 and 27. The crown gears 26 and 27 are mounted on the crank shafts 16. Each crank shaft 16 extends outside and outside the housing 2 there is a downthrust 28.

Each reciprocating piston 11, 12, 13 and 14 presents an active surface 29 forming a chamber 31 with one active surface 30 of the rotary piston. The active surfaces 29 and 30 present on the side a clearly defined profile which has been calculated above by taking into account FIGS. 1 to 8. A spark plug 32 and 33 can be used on every vertex between two adjacent openings in the chamber built between the two active surfaces.

The rotary piston 25 has an internal cavity 34 which is linked to a fuel injection nozzle 35 fixed to a bush 36 located axially in the cover 21 as well as to a fan wheel 37 serving as a turbo wheel, as explained below.

According to its function, the housing 2 presents gills 38 outside the openings 6, 7, 8 and 9 and chambers 39 for a water cooling system between the fixed walls of the openings. As represented better in FIG. 11, the rotary piston 25 presents four vertices 40, 41, 42 and 43 between which there is an active surface 29. The cavity 34 is linked on one side to the fan wheel 37 through a channel 44 for air supply in the direction of the arrow 45 and to the chamber 31 through an opening 46. Each opening 46 can be opened and closed through a valve body 47, which at its axial extremities presents a bolt 48 (FIG. 9) crossing the crown gear 23 and 24 in order to engage a shift gate 49 which is located on the side of the crown gear 23 in the base of the bush 36 and on the side of the crown gear 24 in the base of another bush.

Figure 13:
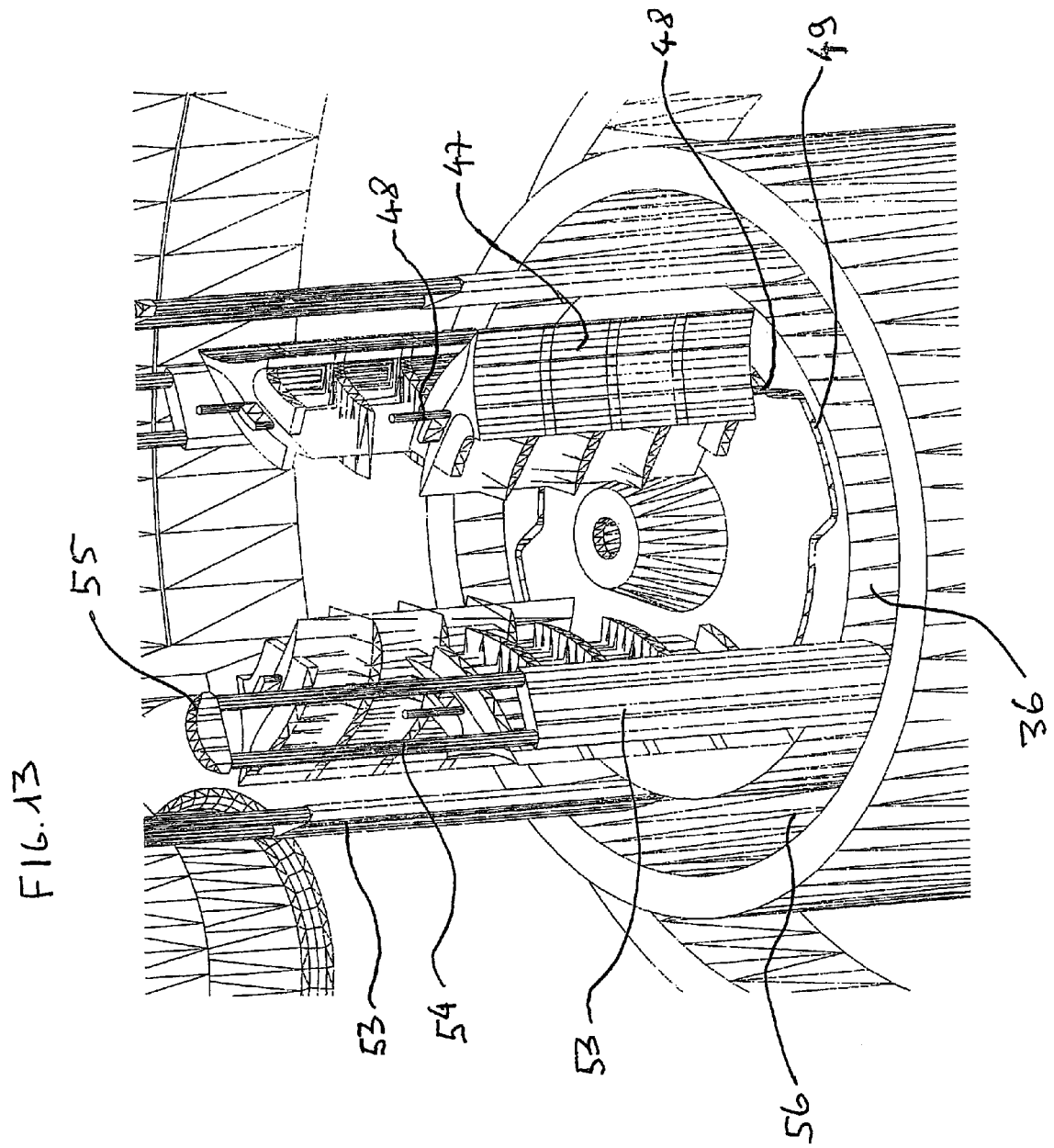
Figure 13A:
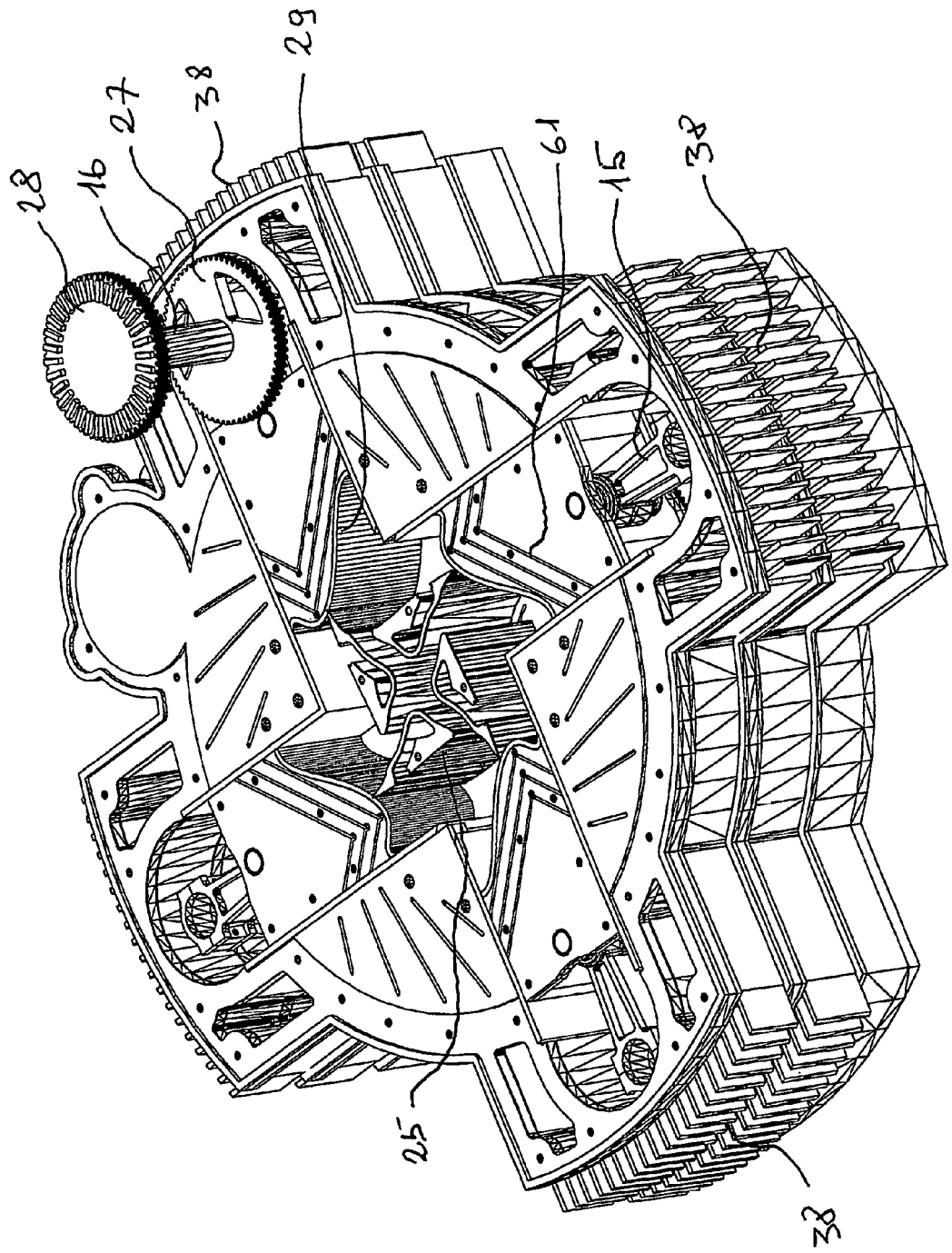

As represented better in the FIG. 13, in each active surface there is an outlet 50 with an exit linked to a fan wheel 37 through a channel 51 according to the arrow 52. The outlet 50 can be opened and closed through a slide 53 equipped with two clamps 54 with cap 55. The cap 55 and a corresponding element, which is not depicted, at the other extremity of the slide move in the corresponding guides 56 positioned between the bush 36 and the one which is not depicted and the covers 21 or 22 on toroid-shaped cams 57 so that the clamp is brought to an exit position for the exhaust gas outlet.

Figure 11:
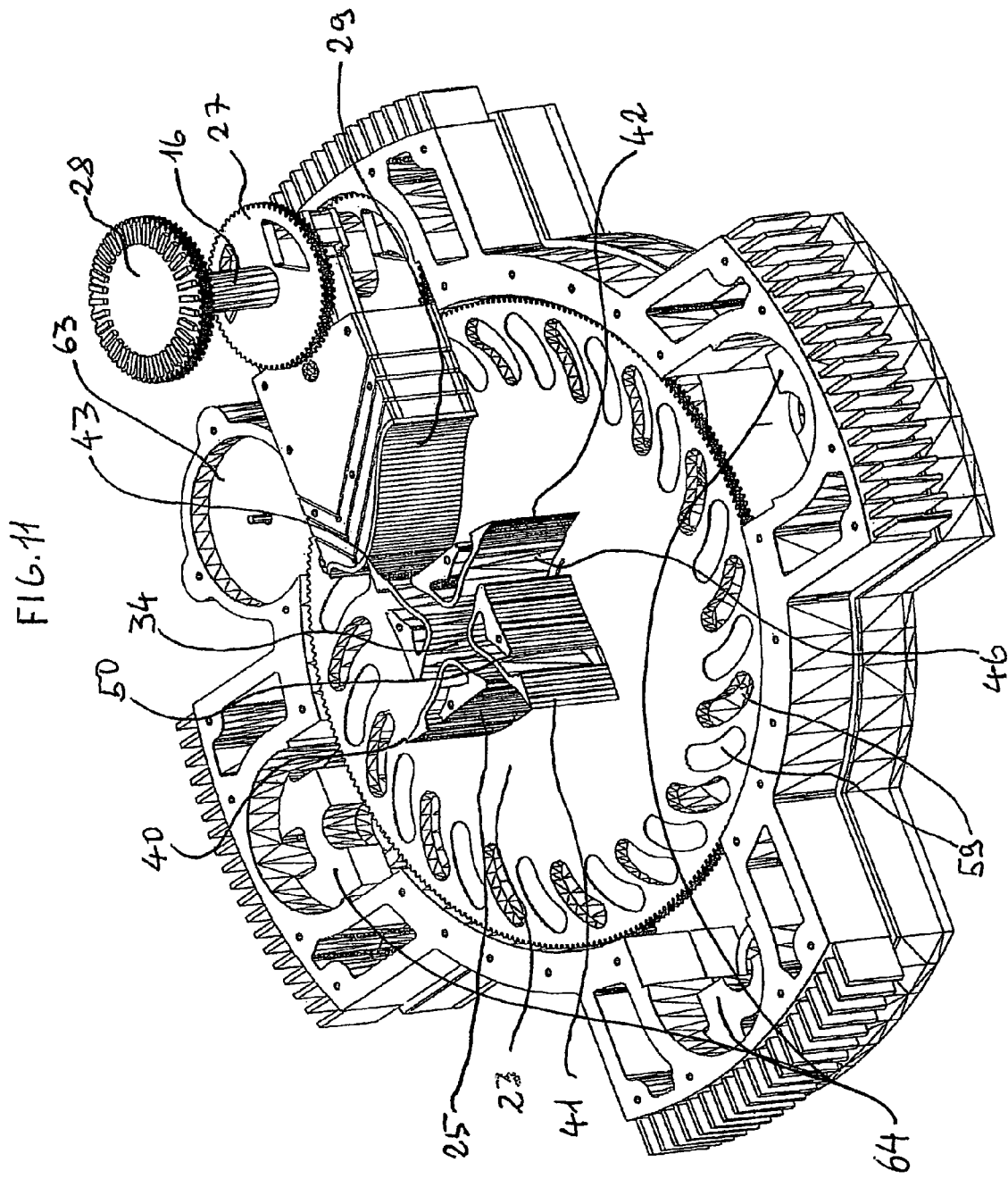
Figure 12:
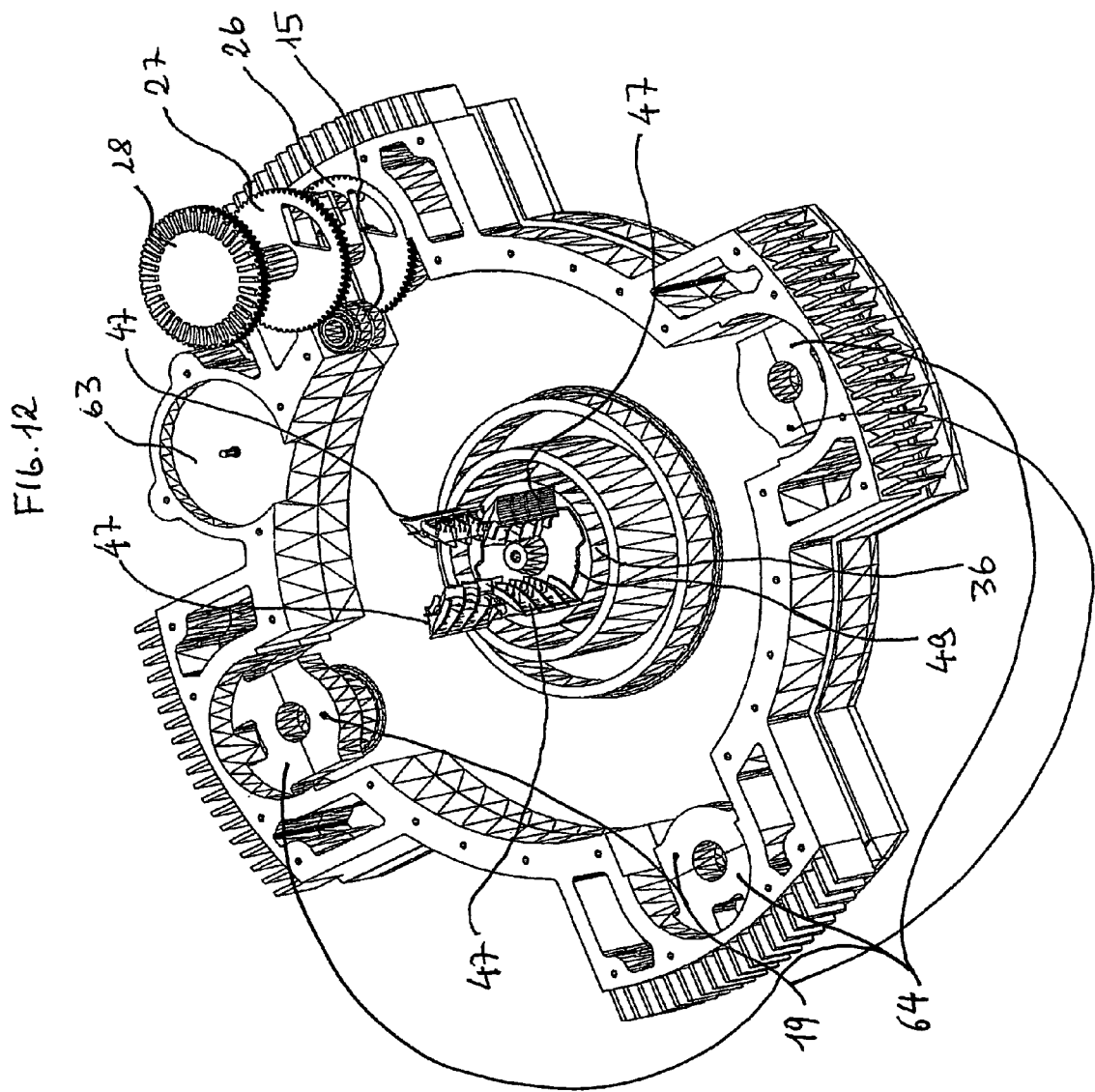

As depicted in FIGS. 11 and 14, each crown gear presents a series of passages 58 as well as a series of recesses 59 along a radial hinge of the crown gear, so that the reciprocating pistons are supplied with lubricants in the upper part of the chamber 31 while the recesses 59 serve for the lubricating oil reserve.

On the outer surfaces of the crown gears there are baffles 60 which are inclined below in the direction of rotation of the engine in order to ensure a proper ventilation and thus proper cooling of the upper and lower side of the chamber (23 and 24).

In a view of the appendix of housing 2, an alternating current generator, of a known type and not depicted, can be positioned in free space 63 outside the crown gear 23 and 24; this generator engages the gear wheel in the corresponding crown gear 23 or 24.

Figure 17:
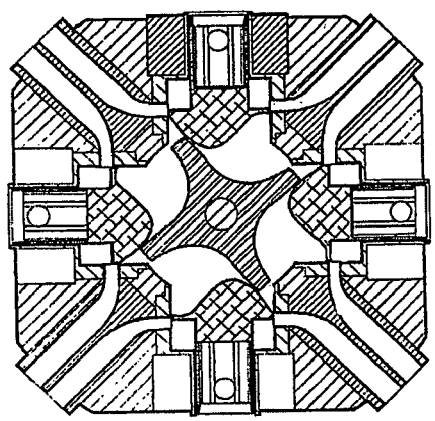
Figure 17:
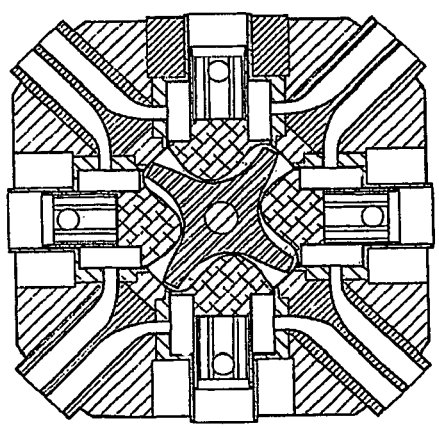
Figure 17:
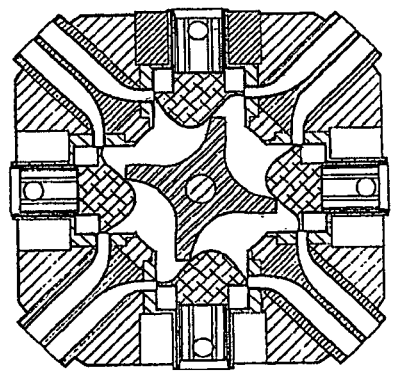

FIGS. 16 and 17 represent a reciprocating/rotary piston engine 100 based on the invention as a two-phase engine The principle is similar to the one of conventional two-phase engines. The usual two phases of a 2-phase engine are possible in this system as well:

The inlet takes place through inlet slits 101 for the air-fuel mix, but without mixing lubricant oils by supplying the mix from the crank shaft housing.

The compression (reduction of the volume) takes place through closed slits.

The ignition through spark plugs 102 takes place through carburation (expansion of the volume with energy production).

The outlet takes place through the outlet slits 103 thanks to the outlet acceleration caused by the exhaust pipe.

With this system it is however possible to let only fresh air enter through the inlet slits and to mix the possible fuels through direct injection into the combustion chamber. These solutions are known in conventional 2-phase engines and can be transferred to our system.

Ignition: Unlike the 4-phase system, in this continuous flow machine each apex of the angle between the side walls 104 of the reciprocating pistons houses the corresponding spark plug 102: four spark plugs 102 are thus necessary in a 4-piston system (number of spark plugs=number of rotary piston sides).

The spark plugs are necessary when fuel which needs to be ignited is used; diesel is not appropriate for this solution as it is almost impossible to reach the necessary compression. However with the concept of the continuous flow machine we can aim at solutions which can take advantage of the self ignition of fuels: with gas fuels it is possible to reach very low emission levels.

Conventional nozzles or spark plugs can be used.

A reciprocating/rotary piston engine has been described as an internal combustion engine. It is however obvious that the reciprocating/rotary piston engine based on the invention can be used as any desired continuous flow machine.

As can be seen in FIG. 15, the pistons 11, 12, 13 and 14 (regardless of the engine being two- or four-stroke) show millings 61 on the sides, in which linear seals (not represented) prevent losses of pressure. Millings and seals are part of the state of the art knowledge, and are often used, for example, in the Wankel engine.

The invention claimed is:

1. A reciprocating piston and rotary piston engine comprising
    a housing containing a rotor as well as a series of openings in which reciprocating pistons move up and down,
    the rotor including a rotary piston having a series of active surfaces between vertices of two, four, six . . . n active surfaces corresponding to a number of the active surfaces of the rotary piston with a corresponding number of active surfaces of the reciprocating pistons and alternately linkable chambers with a fuel supply, a carburation and an exhaust gas outlet,
    a profile of the active surfaces of the rotary piston and of the reciprocating pistons being determined by the following equations:
    xy=reference system originating in a center of rotation of the crank (rotation axis of the a crank shaft);
    r=crank length (radius between rotation axis of the crank shaft and the corresponding crank);
    d=connecting rod length;
    φ=angle of the crank with respect to a reference axis (expressed in radians);
    ψ=circle inscribing the rotor;
    XY=the reference system on which ψ is centered;
    R=radius of the circle ψ;

N=number of rotor flanks=number of crank gears=number of partitions of the circle ψ;

i=incidence line of the piston applied on a middle point of a corresponding arc;

$P_1$=designates incidence point of the line "i" on the circle ψ;

$P_3$=designates an end of a first arc of ψ of the corresponding piston;

α=incidence angle of the piston measured in the point $P_1$ with respect to a tangent of this circle, crossing the same point;

L=arc of ψ of a corresponding piston, between $P_2$ and $P_3$ of a width 2π/N;

C=chord "L", drawn between $P_2$ and $P_3$; this chord is parallel to a tangent of ψ crossing $P_1$;

S=piston width=calculation area of the piston profile=distance between two lines running parallel to the incidence line "i" and applied to the points $P_2$ and $P_3$;

s=dephasing angle: incidence angle of the piston, measured with respect to an axis X of the reference system XY of ψ;

m=line crossing the point $P_1$ from the centre of the rotor;

β=angle between a line "m" and a line "i": a first orthogonal line to the tangent of ψ crossing $P_1$, this angle is always=π/2−α;

X'Y'=another reference system centered on the reference system XY, but rotated with respect to the latter according to the angle="s";

a profile of an active flank of the reciprocating piston is $$\begin{cases} x = R(\sin(\varphi/N + \beta) - \sin\beta) \\ y = R(\cos\beta - \cos(\beta/N + \beta)) + d - r + r\cos\varphi - \sqrt{d^2 r^2 \sin^2\varphi} \end{cases}.$$

2. The reciprocating piston and rotary piston engine according to claim 1, wherein four openings are formed in the housing, a main axis of each opening is perpendicular to an adjacent opening and openings being parallel to each other have shifted axes, the piston glides in each inner opening, each piston is articulated to a connecting rod articulated to a crank shaft, the crank shafts are arranged pivotally in bearings outside the openings in a ring of the housing.

3. The reciprocating piston and rotary piston engine according to claim 1, wherein each said opening is closed on a side, perpendicularly to the rotation axis of the rotor, by a crown gear, said crown gear snaps in with a gear wheel which is mounted on the crank shaft and equipped with downthrusts.

4. The reciprocating piston and rotary piston engine according to claim 1, wherein each reciprocating piston presents an active surface forming the chamber with the active surfaces of the rotary piston.

5. The reciprocating piston and rotary piston engine according to claim 1, wherein, in a four stroke engine, the rotary piston has an internal cavity for connecting to a fuel injection nozzle.

6. The reciprocating piston and rotary piston engine according to claim 5, wherein, in a four stroke engine, the cavity is linked on one side to the chamber through a channel with an air inlet and through an opening, each opening is opened and closed through a valve body, an outlet for a connection through a channel with an exit, the outlet is opened and closed by a slide.

7. The reciprocating piston and rotary piston engine according to claim 6, wherein, in a four stroke engine, the valve body at axial extremities presents a bolt crossing the crown gear in order to engage a shift gate which is located on a side of the crown gear in a base of a bush and on the side of the crown gear located in the base of another bush.

8. The reciprocating piston and rotary piston engine according to claim 1, wherein a spark plug and fuel injection nozzles for the direct injection are used on every vertex between two adjacent openings in the chamber built between the two active surfaces.

9. The reciprocating piston and rotary piston engine according to claim 1, wherein the housing presents gills outside the openings and chambers for a water cooling system between the fixed ends of the openings.

10. The reciprocating piston and rotary piston engine according to claim 1, wherein each crown gear presents a series of passages as well as a series of recesses along a radial hinge of the crown gear so that the reciprocating pistons are supplied with lubricants.

11. The reciprocating piston and rotary piston engine according to claim 1, wherein in a position close to the main housing outside the crown gear there is a body containing an electric generator which engages the crown gear through a gear wheel.

12. The reciprocating piston and rotary piston engine according to claim 1, wherein a housing contains an oil pump which engages a crown gear through a gear wheel.

13. The reciprocating piston and rotary piston engine according to claim 1, wherein each apex of an angle between side walls of the reciprocating pistons houses a corresponding spark plug, and with inlet slits and outlet slits located in a direction of rotation of the rotary piston.

* * * * *